United States Patent [19]

Cox

[11] Patent Number: 5,844,191
[45] Date of Patent: Dec. 1, 1998

[54] METHOD OF AND SYSTEM FOR MANUFACTURING A HELICAL CUTTER

[75] Inventor: Jimmy Arthur Cox, Clemmons, N.C.

[73] Assignee: Westinghouse Electric Corporation, Pittsburgh, Pa.

[21] Appl. No.: 904,155

[22] Filed: Jul. 31, 1997

[51] Int. Cl.[6] .............................. B23H 7/20; B23H 7/02; B23H 5/04; B23H 9/00
[52] U.S. Cl. ................................... 219/69.12; 219/69.13; 219/69.17; 364/474.04; 409/80
[58] Field of Search .............................. 219/69.13, 69.17, 219/69.12, 69.15; 364/474.04, 474.06, 474.24; 409/79, 80

[56] References Cited

U.S. PATENT DOCUMENTS

| | | | |
|---|---|---|---|
| 3,322,185 | 5/1967 | Christenson | 219/69.15 |
| 4,490,600 | 12/1984 | Rae | 219/69.12 |
| 4,793,220 | 12/1988 | Yamamoto et al. | 219/69.17 |
| 5,014,421 | 5/1991 | Swarden et al. | 219/69.17 |
| 5,091,622 | 2/1992 | Ohba | 219/69.15 |
| 5,177,689 | 1/1993 | Kinasi et al. | 364/474.24 |
| 5,377,116 | 12/1994 | Wayne et al. | 364/474.24 |

FOREIGN PATENT DOCUMENTS

88/10167  12/1988  WIPO .

OTHER PUBLICATIONS

Illustrations of Turbine Rotor Cutting Tool manufactured by Precision Tool Works of Philadelphia, PA, (old design side view and old design looking from end) No Publication Date.

*Primary Examiner*—Geoffrey S. Evans
*Attorney, Agent, or Firm*—David C. Maire; Daniel C. Abeles; Eckert Seamans Cherin & Mellott, LLC

[57] ABSTRACT

A method and a system for creating an improved cutting tool having a helical shaped cutting surface includes a computer, a computer numerically controlled milling machine and an electric discharge machine. The computer can be programmed to form the female shape of a helical spline of a cutting tool that extends longitudinally from the back of the tool to the front of the tool so that it is not parallel to a plane perpendicular to a longitudinal axis of the tool. Disposed along the spline may be a plurality of cutting teeth that each extend outward from the curved spline and have a cutting face that is curved in both a radial direction and in an axial direction with respect to the cutting tool. After forming the female shape of this spline, the computer can develop a cutting path for a tool of a numerically controlled milling machine and operate the milling machine to create an electrode having the female shape of the spline of the cutting tool. This electrode can be installed into an electric discharge machine that has a cutter blank loaded into the machine. The electric discharge machine can then be employed to form the male shape of the spline of the cutting tool.

21 Claims, 6 Drawing Sheets

METHOD OF AND SYSTEM FOR MANUFACTURING A HELICAL CUTTER

BACKGROUND OF THE INVENTION

This invention relates to a process and a system for manufacturing an improved cutting tool that has a helical shaped cutting surface. This improved cutting tool may be used in the manufacturing of turbine rotors. This application is related to the subject matter of commonly assigned co-pending U.S. patent application Ser. No. 08/905,708 (attorney docket number T196015) filed Aug. 5, 1997, pending, entitled "Helical Cutter Geometry for A Cutting Tool Used to Manufacture Turbine Rotors," which is hereby incorporated by reference.

Milling or boring machines may employ a variety of cutting tools. A cutting tool may be of the type that has a longitudinal axis with teeth disposed around the circumference of the longitudinal axis. These cutting tools can be inserted into a hole and rotated about their longitudinal axis to bore a larger hole to a specified shape, such as a larger diameter. Tools of this type are well known and may be employed in manufacturing tubular shaped structures, such as a turbine rotor.

A cutting tool may be classified as either a standard cutting tool or a form cutting tool. A standard cutting tool is prefabricated to certain dimensions and can typically be purchased by specifying a stock number or the like. In contrast, form cutters are those that are designed to cut a work piece to a specific shape. Form cutters are typically manufactured to specific dimensions as specified by the purchaser. As those of skill in the art will appreciate, tools used in the manufacturing of turbine rotors are typically form cutters.

During cutting operations chips are created. These chips vary in size and shape depending on the type of material being cut, the material doing the cutting and in large part on the geometry of the cutting tool. The size and shape of the chips, and consequently the geometry of the cutting tool is important because it affects the speed of cutting, tool wear, surface finish, safety of a cutting operation, machining tolerances and other characteristics of the cutting process. For instance, continuous chips generally produce a good surface finish but may present a safety concern for the tool operator. In comparison, segmented chips may cause a severe distortion of the metal in the area adjacent to the tool and cracking of the work piece. One way to control the type of chip generated is to select the proper geometry of a cutting tool. Thus, the geometry of a cutting tool is a critical feature in controlling the cutting process.

The tool geometry may also affect the force or torque required to cut a work piece. Typically, the tool face of a cutting tool, the surface against which the chips bear, is inclined to either increase or decrease the keenness or bluntness of the cutting edge. Conventionally, the inclination of the cutting face is referred to as the rake angle. Since the tool face may be inclined in more than one direction, a cutting surface may have more than one rake angle. Rake angles can be either positive or negative. A rake angle is positive if the cutting edge leads the surface of the tooth face with respect to a work piece and negative if it lags behind the tooth face. Positive rake angles tend to reduce the requisite cutting force or torque and direct chip flow away from the work piece. In contrast, negative rake angles generally increase the required cutting force, but provide greater strength at the cutting edge.

Conventionally, cutting tools used to manufacture turbine rotors have a plurality of teeth disposed axially and circumferentially along the cutting tool. Each tooth is disposed along a spline extending axially from the front of the tool to the back of the tool. Each spline extends parallel to the longitudinal axis of the tool. The cutting face of each tooth along the spline is substantially parallel to the cutting face of the other teeth disposed along that spline. Additionally, the teeth are disposed at a rake angle of zero in both the axial and radial directions. The tolerance of cuts made with a tool of this geometry is limited. Furthermore, the efficiency of the cutting process and the cutting speed are also limited with this type of tool. Moreover, the force or torque required to cut with a tool of this geometry is relatively substantial.

Because of the limitations of conventional cutting tools, an improved cutting tool used to manufacture turbine rotors is needed. Conventional methods and systems of manufacturing cutting tools have prevented the development of such an improved cutting tool. In particular, cutting tools of this type were conventionally manufactured with a milling machine or similar cutting machine. Because of the limitations inherent in milling processes, the geometry of cutting tools manufactured with a milling process is limited. Thus, in order to manufacture an improved cutting tool, a new process and system for manufacturing cutting tools is needed.

SUMMARY OF THE INVENTION

A method and a system for creating an improved cutting tool having a helical shaped spline includes a computer, a numerically controlled milling machine and an electric discharge machine. Disposed along the spline of the cutting tool may be a plurality of cutting teeth that each extend outward from the curved spline and have a cutting face that is curved in both a radial direction and in an axial direction with respect to the cutting tool. In a preferred embodiment of this invention, the spline and the cutting face of the teeth are helical in shape. The computer can be programmed to generate the female shape of this helical spline. After forming the female shape of this spline, the computer can develop a cutting path for a tool of a numerically controlled milling machine and operate the milling machine to machine an electrode to the female shape of the spline of the cutting tool. This electrode can be installed into an electric discharge machine that has a cutter blank loaded into the machine. The electric discharge machine can then employ the electrode to form the male shape of the spline on the cutting blank and thereby create a cutting tool having a helical shape.

This system may also employ a wire electric discharge machine. The male shape of the spline formed on the cutter blank may be inserted into the wire electric discharge machine and the wire electrode of the wire electric discharge machine can then be used to machine the cutting surfaces of the spline.

As alluded to above, the computer may be programmed to form the female shape of a helical spline from the male shape of the helical spline. The male shape of the helical spline is formed by inputting the longitudinal cross sectional shape of the helical spline and the helical angle of the spline into the computer. From these parameters, the computer can then generate a three dimensional helical curve that conforms to the outer edge of the cutting surface of the spline. Based on this helical curve, the computer can create a three dimensional helical surface that corresponds to the cutting surface of the spline. After forming this cutting surface the computer can then use the helical angle to generate the three dimensional shape of the spline. From this male shape of the spline, the computer can determine the female shape of the helical spline. A tool path conforming to the female shape of the spline can then be generated and downloaded to the numerically controlled milling machine to create an electrode having a female shape of the helical spline.

The cutting tool of this invention may be employed in a variety of milling machines. In a preferred embodiment, it is used in a horizontal boring machining to manufacture a turbine rotor.

DETAILED DESCRIPTION OF THE PREFERRED EMBODIMENTS

Figure 1:
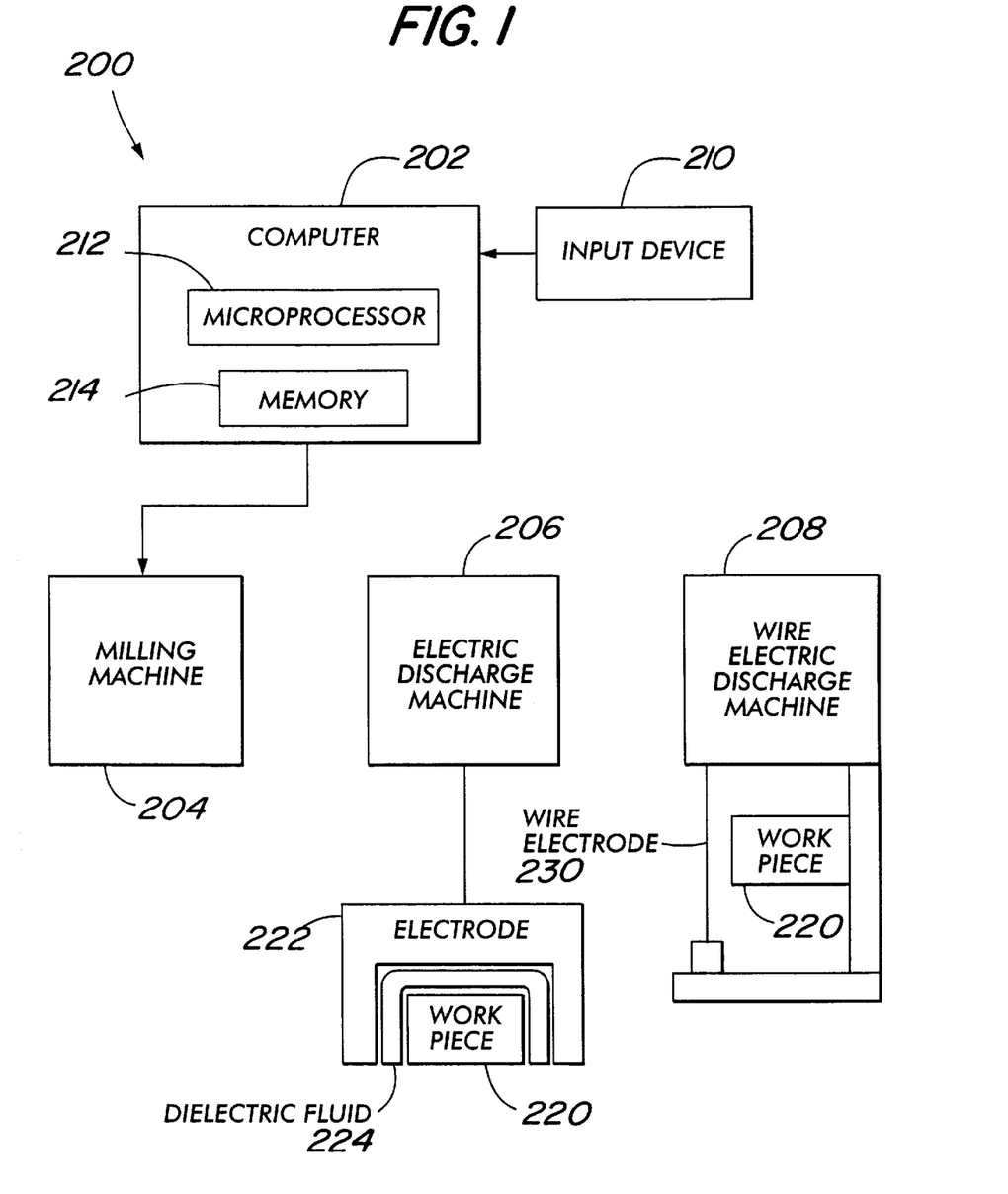
FIG. 1 is a schematic diagram of a system according to a preferred embodiment of this invention.

Referring now to the drawings, wherein like reference numerals designate corresponding structure throughout the views, and referring in particular to the schematic diagram of FIG. 1, a system 200 for manufacturing an improved cutting tool generally includes a computer 202, a milling machine 204, an electric discharge machine 206 (EDM) and a wire electric discharge machine 208. The computer 202 may be a conventional programmable personal computer having an input device 210, such as a keyboard, a microprocessor 212, and memory 214. Similarly, the milling machine 204, the electric discharge machine 206 and the wire electronic discharge machine 208 may all be conventional machines that are well known in the art. By way of background, an electric discharge machine 206 cuts a work piece 220 by placing an electrode 222 near the surface of the work piece 220 and disposing a dielectric fluid 224 between the work piece 220 and the electrode 222. A relatively high current is then sent through the electrode 222 and to the work piece 220 to cut or burn the surface of the work piece 220 to a shape corresponding to the exterior surface of the electrode 222. Wire electric discharge machines 208 function similarly to electric discharge machines 206 except that wire EDM's 208 employ a wire as the electrode 230. A current is run through the wire and the work piece 220 is moved so that the surfaces of the work piece 220 to be machined come in close proximity to the wire electrode 230 and are cut by the wire electrode 230.

The milling machine 204 may be a computer numerically controlled machine that interfaces with the computer 202 to machine a work piece 220 to a desired shape as determined by the computer 202. More particularly, the computer 202 may instruct the milling machine 204 to follow a predetermined path to cut a work piece 220 to a desired shape.

Figure 4:
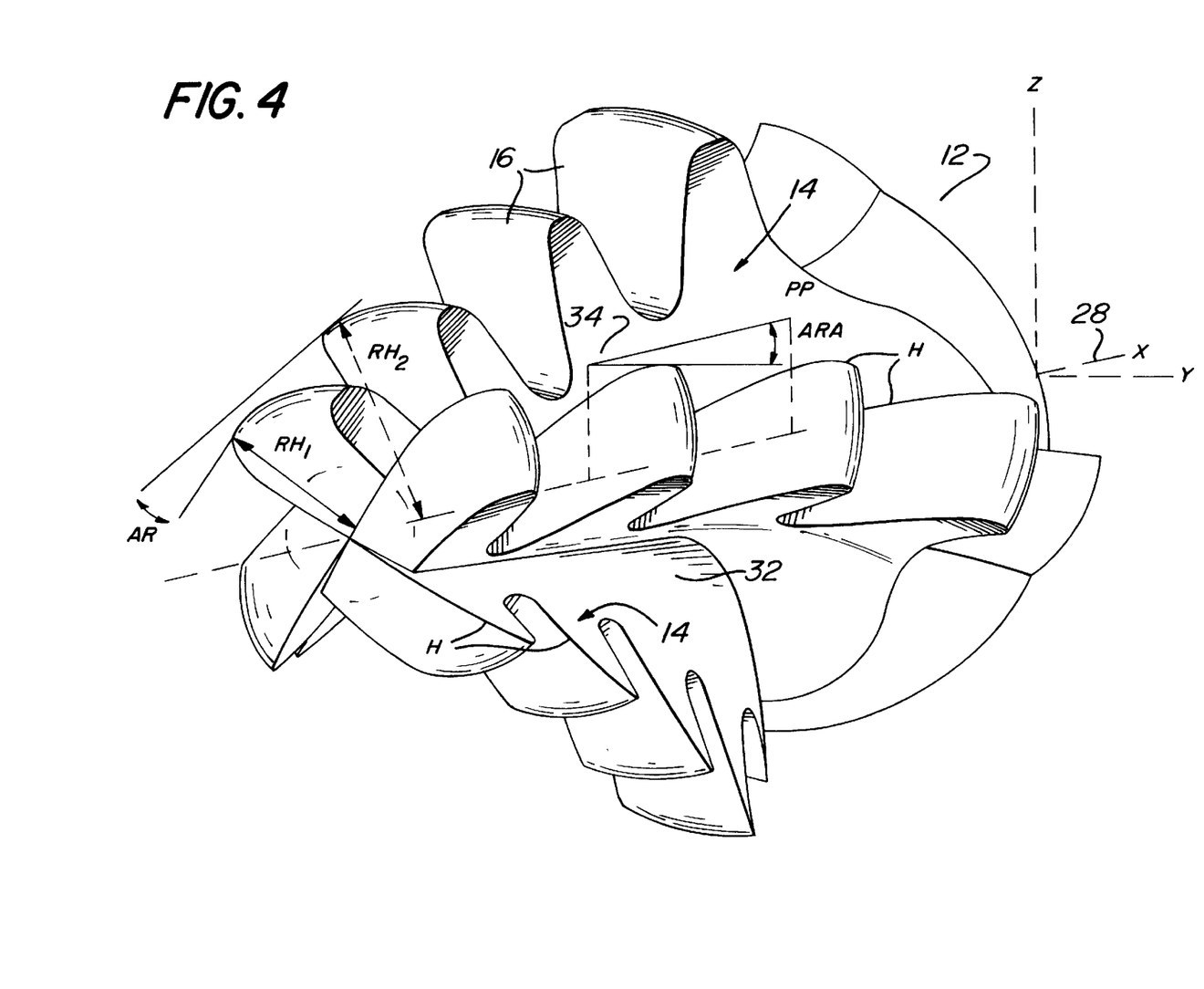
FIG. 4 is an isometric view of a cutting tool formed with the system of FIG. 1 and the method of FIG. 2.
Figure 5:
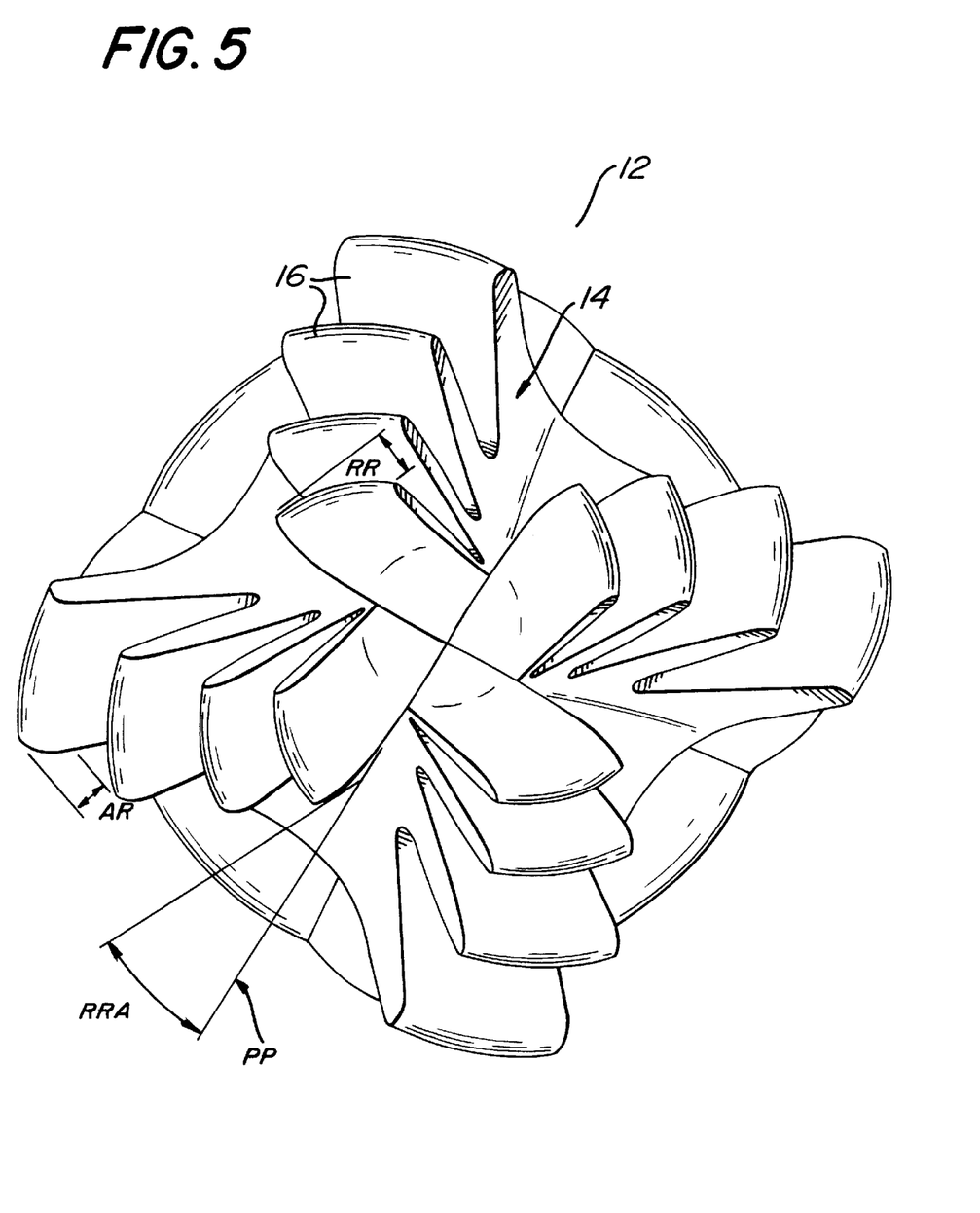
FIG. 5 is an end view of the cutting tool of FIG. 4.
Figure 6:
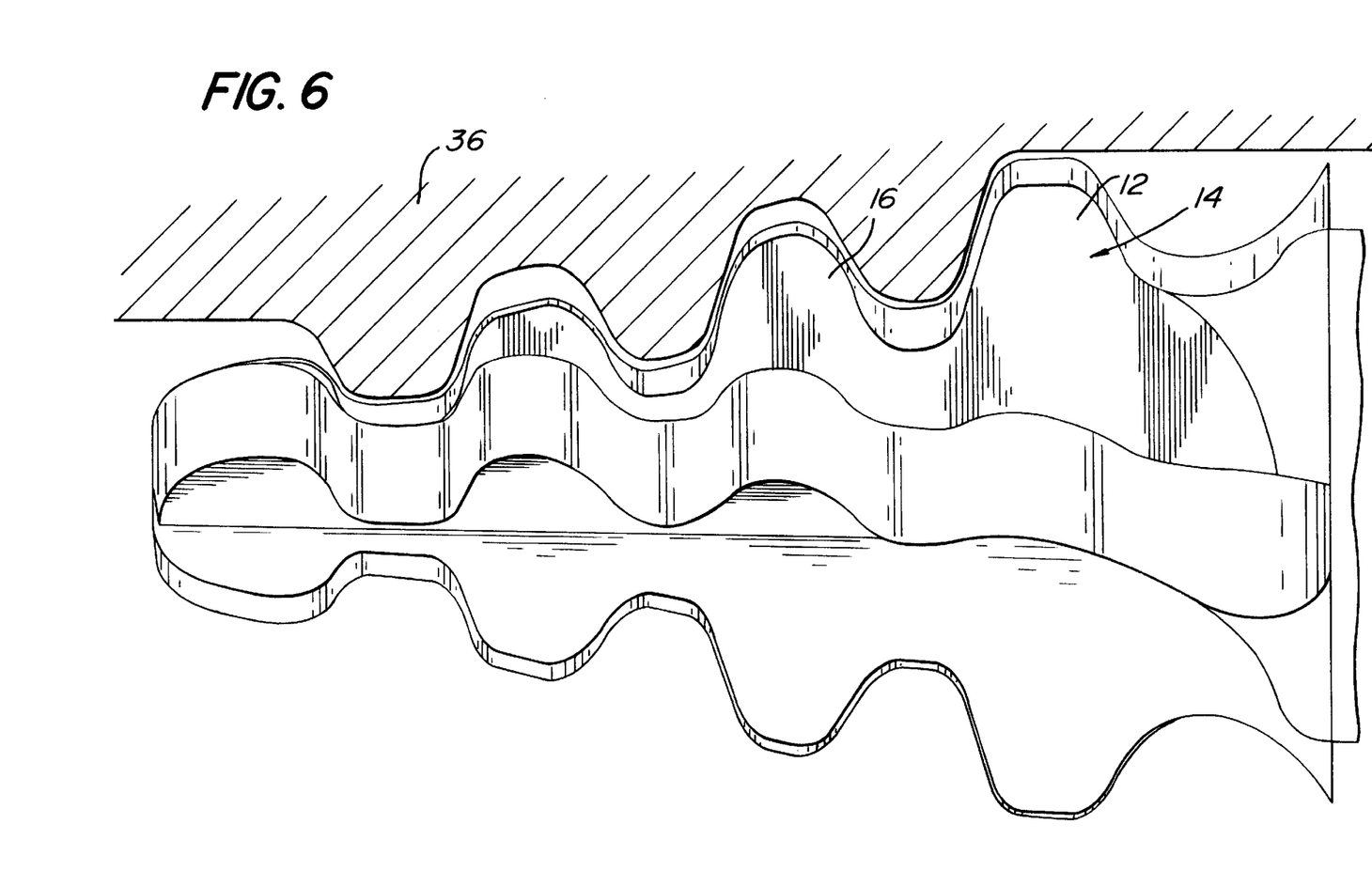
FIG. 6 is a diagrammatical view of the cutting tool of FIG. 4 in operation.

Loaded into the computer 202 may be any of the conventional computer aided design (CAD) programs that are commercially available. By using one of these CAD programs, the computer 202 can be programmed to form a cutting tool 12 having the novel shape as illustrated in FIGS. 4–6. In order to more easily understand the manufacturing process of this invention, the novel geometry of a cutting tool is provided. In the embodiment depicted, the cutting tool 12 has a plurality of splines 14 with a plurality of teeth 16 disposed on each spline 14. In a most preferred embodiment, the tool 12 has four splines 14 with four teeth 16 disposed on each spline 14. Each spline 14 extends from the back of the cutting tool 12 to the front of the cutting tool 12. As is shown in FIGS. 4 and 5, the splines 14 are helically curved and do not extend parallel to a plane perpendicular to the longitudinal axis 28 of the cutting tool 12. For later reference, the longitudinal axis 28 of the cutting tool 12 has been labeled as the X axis and the transverse axes of the cutting tool 12 have been denoted as the Y and Z axes.

Each spline 14 has a cutting side 32 and a relief side 34. The cutting side 32 contacts the material to be cut as the cutting tool is rotated in the counter clockwise direction and is the surface upon which chips from the work piece impinge as the tool is rotated. Both the cutting side 32 and the relief side 34 are curved helically with respect to the longitudinal axis of the cutting tool. A helical shape is generally defined as a curve generated by a point moving about a cylindrical surface at a constant rate in the direction of the cylinder's axis. The shape of the cutting side 32 traverses such a helical pattern. Additionally, the relief side 34 also traverses a helical shape.

By curving the cutting side 32 and therefore the cutting face of the teeth 16, each tooth 16 forms angles that enhance the cutting process. One such angle is the radial rake angle RRA, formed between the face of each tooth 16 and a plane PP perpendicular to the cutter's longitudinal axis, as denoted in FIG. 5. Since the face of each tooth 16 may be substantially curved, the radial rake angle RRA for a given point along the tooth face may be determined by drawing a tangent at that point and determining the angle between the plane PP and the tangent line. One such radial rake angle RRA is illustrated in FIG. 5. In accordance with conventional notation, the radial rake angle RRA for each tooth is positive because the cutting edge of the tooth leads the surface of each tooth face. This is significant because as chips are formed, a cutting surface with a positive radial rake angle directs the flow of chips away from the tool and the work piece. Moreover, the positive radial rake angle reduces the amount of force and torque needed to cut the work piece, as compared to a tool having teeth with either a radial rake angle of zero or a negative radial rake angle. Because of the helical shape of the teeth 16, the radial rake angle RRA increases as one moves from the inner portion of each cutting tooth to the outer portion of each cutting tooth. By varying the radial rake angle RRA in this manner, the advantages of a positive radial rake angle described above are accentuated.

As can be seen in FIGS. 4 and 5, because the cutting side 32 traverses a helical shaped pattern, the teeth 16 of the cutting tool also have a cutting face that is curved with respect to the axial direction of the tool, the X axis. Due to this curvature, each tooth 16 also forms an axial rake angle ARA, shown in FIG. 4, between a line tangent to its cutting face in the axial direction and the plane PP perpendicular to the longitudinal axis of the cutting tool. As with the radial rake angles RRA, the axial rake angles ARR for each tooth is positive. Consequently, similar advantages, such as relatively lower forces and torques and continuous chip formation, are also achieved with the positive axial rake angles ARA. As is best shown in FIGS. 4 and 5, the axial rake angle ARA of any tooth closer to the front of the cutter is less than the axial rake angle ARA of any tooth further away from the front of the cutter. Alternatively stated, the axial rake angle ARA increases as a tooth's distance from the front of the tool increases. By varying the axial rake angle ARA in this manner, the advantages discussed above are even further enhanced.

Relief refers to the shape of the tool that provides relief for the cutting edge to keep the tool from rubbing on the cutting surface. When machining relatively hard materials, relief angles are typically minimized to provide support for the cutting tool. The cutting tool 12 has relief angles that are sufficient to keep the tool from rubbing on the cutting surface and to adequately support the tool. As is evident from FIGS. 4–6, the radial height of any tooth 16 along a spline 14 is less than the height of any tooth 16 disposed behind it, and greater than any tooth 16 disposed forward of it. This provides relief for the teeth 16 in the axial direction and is denoted as AR in FIG. 5. Furthermore, the top of each tooth 16 is sloped to provide relief in the radial direction, radial relief RR. Relief in the radial direction is termed radial relief and is denoted as RR in FIG. 5. This sloping of the top of each tooth 16 prevents the top of each tooth 16 from rubbing on the surface of the material being cut and therefore, provides relief in the radial direction. Similarly, sloping the cutting face of each tooth in the axial direction prevents rubbing on the surface of the material being cut.

Thus, an improved cutting tool 12 has a plurality of splines 14 running from the back of the tool to the front of the tool in a helical shape. Because of the helical curvature of these splines 14, they create axial and radial rake angles that are both positive and enhance the cutting process. Furthermore, this helical curvature also creates both axial and radial relief angles that also enhance the cutting process.

Figure 2:
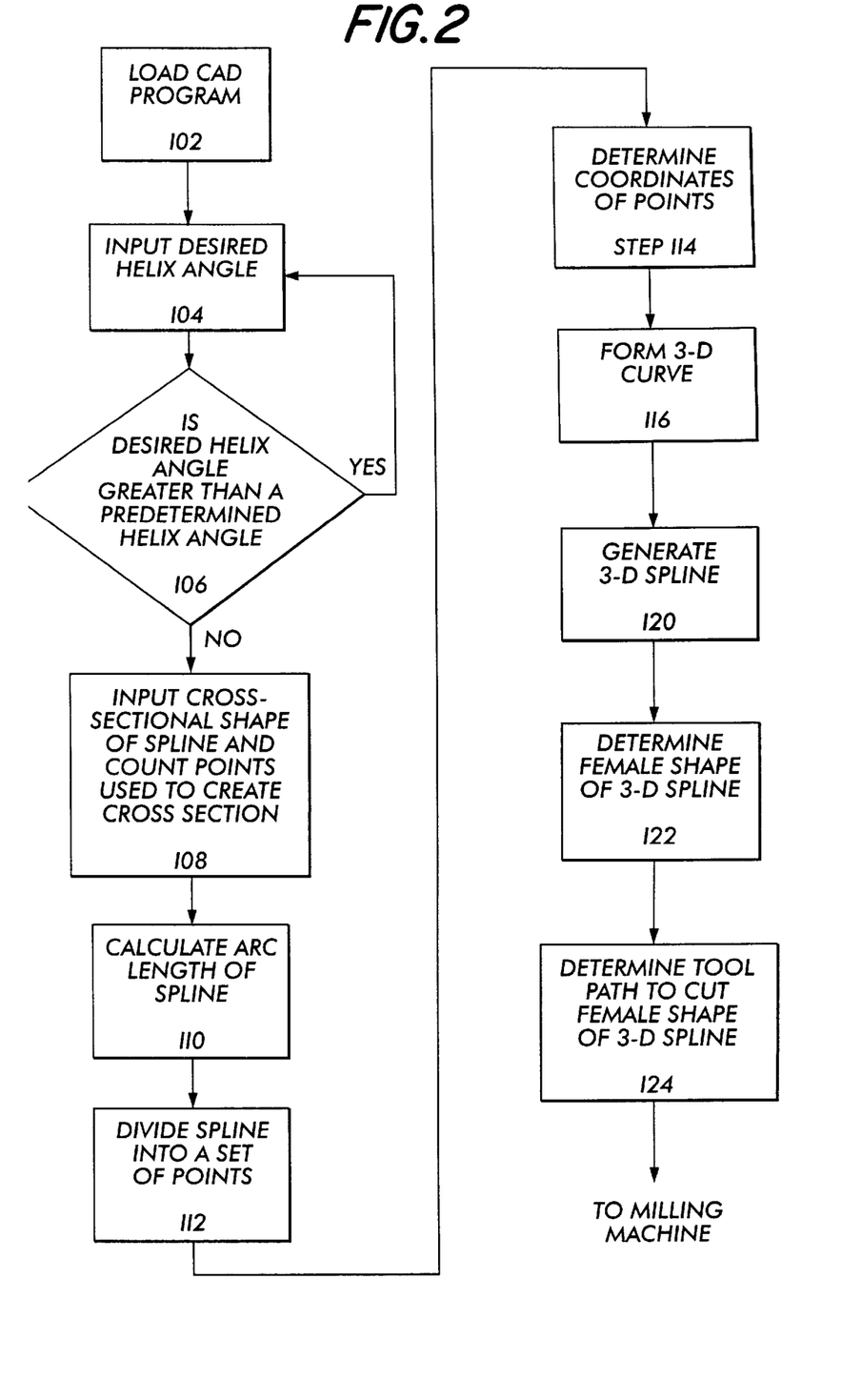
FIG. 2 is a flow chart of a method according to a preferred embodiment of this invention.

In order to form the cutting tool described above, the computer is programmed as depicted in the flow chart in FIG. 2. A conventional CAD program is loaded into the computer 202. (step 102). A desired helix angle is selected and inputted to the computer 202 and stored. (step 104). The helical angle may be defined as the measure of the inclination of a helical curve or thread from a plane that is perpendicular to the axis of the helical curve or thread. The computer 202 determines if the helix angle exceeds a predetermined design angle, which in a preferred embodiment is 45°. (step 106). If the predetermined design angle is exceeded, the computer repeats step 104 and requests another helix angle.

Figure 3:
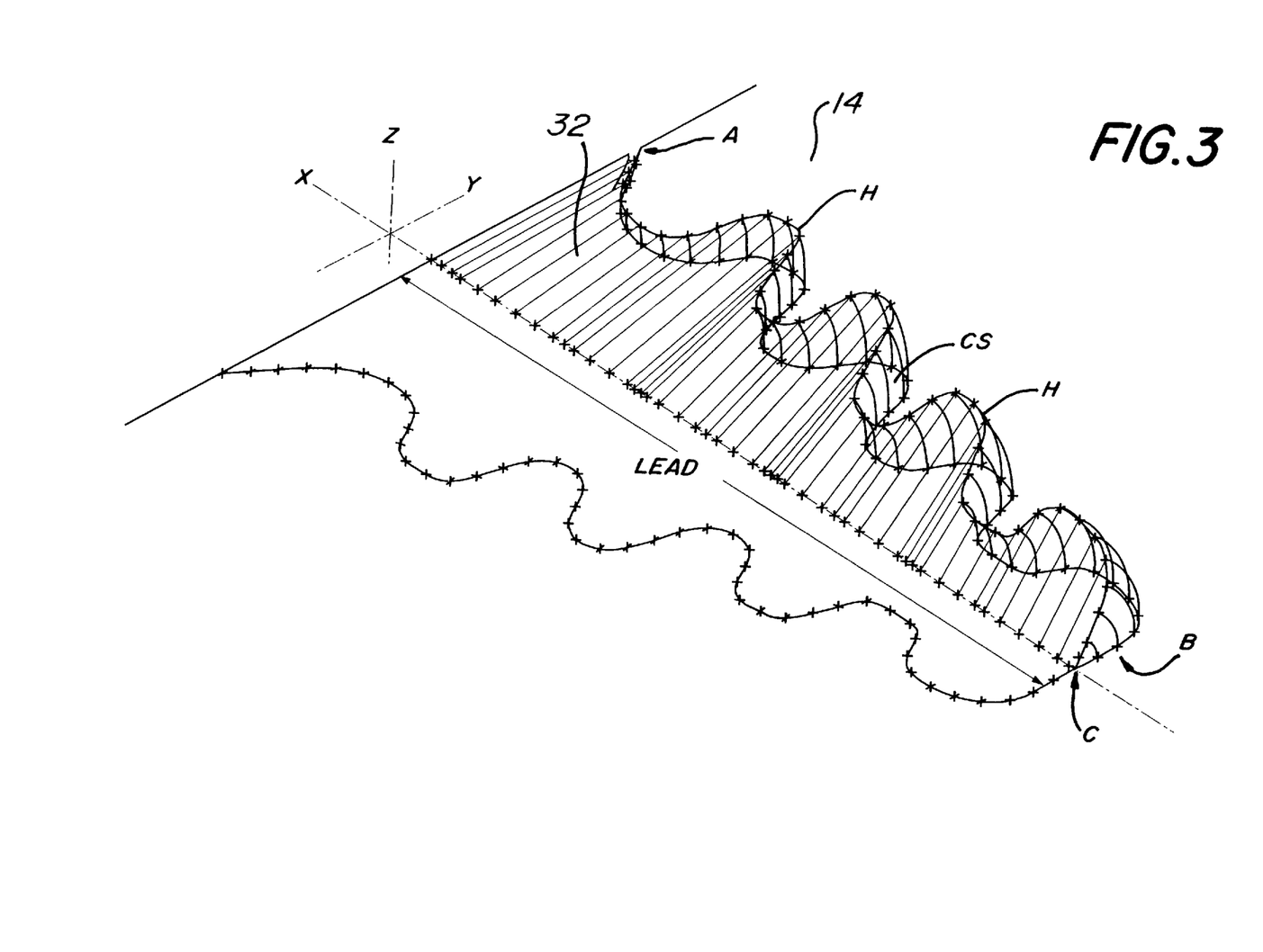
FIG. 3 is a schematic diagram of a portion of a cutting tool being formed with the system depicted in FIG. 1 and the method illustrated in FIG. 2.

Depicted in FIG. 3 is a three dimensional view of the curvature of a spline of a cutter as it is being formed according to a preferred embodiment of this invention. As can be seen in FIG. 3, the spline 14 has a cross section CS in the X-Y plane. This cross sectional shape is inputted into the computer through the use of the CAD system. (step 108). For example, the lines, arcs and other geometric shapes that comprise this cross section can be inputted into the CAD system to form the cross sectional shape. In forming this cross sectional geometry, the computer uses a plurality of points and connects these points together to form the cross-sectional shape CS in the X-Y plane. In step 108, the computer also counts the number of points that it uses to create this geometry.

After creating the cross-sectional geometry of the cutter in the X-Y plane, the computer calculates the arc length of the spline. (step 110). The arc length of the spline is the distance along the spline in the X-Y plane from point A to point B as denoted in FIG. 3. The computer than divides the spline into a set of points incrementally disposed along the arc length. (step 112). For illustrative purposes, some of these points are shown in FIG. 3 as x's along the arc length of the spline in the X-Y plane. For each point along the arc length of the spline, the computer then calculates its coordinates in the X, Y, and Z planes. (step 114).

After calculating the three dimensional coordinates of each of these points, all of which are located in the X-Y plane, the computer then takes this dimensional shape and forms a three dimensional curve as a function of the helix angle. (step 116). As mentioned above, a helix is generally defined as a curve generated by a point moving about a cylindrical surface at a constant rate in the direction of the cylinder's axis. (For example, the curvature of the threads of a screw form a helix). Thus, in order to form a curved helical shape each point disposed along the arc length is rotated as if it were a point moving about an imaginary cylindrical surface. This is accomplished by first calculating a multiplier equal to the selected helix angle divided by the number of points disposed along the arc length of the two dimensional spline. Each point disposed along the two dimensional arc length is then rotated an angular distance equal to the product of its distance from the X=0 plane times the multiplier. After each point has been rotated, the computer fits a smooth curve through these points. As a result, a three dimensional curve, denoted as H in FIG. 3 is formed. This three dimensional curve H begins at point A and ends at point C and conforms to the curve of the outer edge of the cutting surface 32 of the spline 14 of the cutting tool 12 depicted in FIGS. 4 and 5, and labeled as H.

From this three dimensional helical shaped curve, the computer generates a three dimensional spline. (step 120). This is accomplished by creating a helical surface 32, which corresponds to the cutting surface, bound by the helical shaped curve and the X and Y axes. Each point along the helical shaped curve is then rotated about the X axis a distance equal to the helix angle. A helical curve is then smoothly fit through these rotated points to form the outer edge of the relief side of the spline, labeled as 34 in FIG. 4. The area bound by this curve and the X and Y axis forms the relief side of the spline, and a three dimensional spline has been created.

After generating the geometry of the spline of the cutting tool, the computer then calculates the tool path for cutting a female shape of the cutter from a standard working piece. This tool path is downloaded to the CNC milling machine, and a graphite electrode is loaded into the milling machine. The milling machine then cuts the female shape of the cutter in the graphite electrode according to the path calculated by the computer. Although only the male shape of the cutting tool is depicted, those of skill in the art will readily conceptualize the female shape of the cutting tool from these Figures.

The graphite electrode cut by the milling machine may then be polished or finished to form a smooth surface. The graphite electrode and a cutter blank are then loaded into an electronic discharge machine. The electrode is then placed in close proximity to the cutter blank and a voltage is applied to the electrode to form the helical shaped cutting tool. After being cut on the electric discharge machine, the cutting tool is then loaded onto a wire electric discharge machine. A voltage is applied to the wire electrode and the cutting teeth of the cutting tool are cut with the wire to form a fine cutting edge. The cutting tool may then be polished and finished to smooth the surfaces of the cutting tool.

As a result of this method and employment of this system, the cutting tool 12 described above having a cutting surface 32 that traverses a helical pattern can be manufactured. This cutting tool is significant because it has positive rake angles and relief angles, which enhance the cutting process. A tool manufactured by this process can be used in the manufacturing of turbine rotors. In particular, the center of a turbine rotor can be bored with this tool, as depicted in FIG. 6. The cutting tools formed by this process and system can be either form cutters or standard cutters. For example, a cutting tool can be formed to a predetermined helical angle or cutting tools may be manufactured in bulk to standard helical angles.

Because the preferred method and system of this invention employs electric discharge machines to form the cutting tool, the relatively hard cutting blank is not machined in a milling machine. Rather, the female shape of the cutting tool can be machined in the relatively softer graphite electrode, which can then be used in the electric discharge machine. This can be significant because the limitations inherent in machining a relatively hard blank with a milling machine can prevent or complicate the formation of a cutting tool having the relatively complex helical geometry as described above.

Operation of the cutting tool 12 is depicted in FIG. 6. A portion of a material 36 to be machined into a rotor for a turbine is illustrated. The cutting tool is inserted into a pilot hole in the rotor and rotated to cut the material 36 to the desired diameter. It will be appreciated that since the teeth have a radial height that is successively larger from the front of the tool to the back of the tool, the tool creates a larger and larger diameter as it travels axially through the material 36.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

I claim:

1. A method of manufacturing a cutting tool, comprising the steps of:
   programming a computer to form a female shape of a curved spline of a cutting tool extending from a back of the tool to a front of the tool and having a curved face, the spline having a plurality of cutting teeth that each extend outward from the curved spline and have a cutting face that is curved in both a radial direction and in an axial direction with respect to the cutting tool;
   machining an electrode to the female shape of the spline of the cutting tool with a numerically controlled milling machine operated by the computer; and
   employing the electrode having the female shape of the spline of the cutting tool in an electric discharge machine to form the male shape of the spline of the cutting tool.

2. The method of claim 1, further comprising the step of installing a cutting blank into the electric discharge machine prior to the step of employing so that the electrode can be applied to the cutting blank.

3. The method of claim 1, further comprising the step of machining a cutting surface of the male shape of the spline of the cutting tool formed by the step of employing with a wire electric discharge machine.

4. The method of claim 1, wherein the step of programming comprises the step of inputting a cross sectional shape of the spline into the computer.

5. The method of claim 1, wherein the curved face of the spline forms a cutting surface that is helical with respect to the longitudinal axis.

6. The method of claim 1, wherein the step of programming comprises inputting a predetermined helical angle into the computer.

7. The method of claim 6, wherein the step of programming further comprises determining whether the predetermined helical angle exceeds a maximum helical angle.

8. The method of claim 1, wherein the step of programming comprises generating a three dimensional helical curve that conforms to an outer edge of a cutting surface of the spline.

9. The method of claim 1, further comprising the steps of generating a cutting path corresponding to the female shape of the spline with the computer and downloading this cutting path to the numerically controlled milling machine.

10. The method of claim 1, wherein the cutting face of each tooth of the teeth is curved in the axial direction to form a positive axial rake angle and curved in the radial direction to form a positive radial rake angle.

11. A system for manufacturing a cutting tool, comprising:
    a computer having an input device, a microprocessor, a memory and a programming means for forming a female shape of a spline of a cutting tool extending from a back of the tool to a front of the tool so that it is not parallel to a plane perpendicular to a longitudinal axis of the tool, the spline having a plurality of cutting teeth that each extend outward from the curved spline and have a cutting face that is curved in both a radial direction and in an axial direction with respect to the cutting tool;
    a numerically controlled milling machine adaptable to be operated by the computer to create an electrode having the female shape of the spline of the cutting tool; and
    an electric discharge machine adaptable to employ the electrode having the female shape of the spline of the cutting tool to a cutting blank to form a male shape of the spline of the cutting tool.

12. The system of claim 11, further comprising a wire electric discharge machine adaptable to machine a cutting surface of the male shape of the spline of the cutting tool formed by the electric discharge machine.

13. The system of claim 11, wherein the spline has a cutting surface that is helical with respect to the longitudinal axis.

14. The system of claim 11, wherein the computer further comprises a generating means for generating a three dimensional helical curve that conforms to an outer edge of a cutting surface of the spline.

15. The system of claim 11, wherein the input device comprises a means for inputting a cross sectional shape of the spline into the computer.

16. The system of claim 11, wherein the cutting face of each tooth of the spline is curved in the radial direction to form a positive radial rake angle.

17. The system of claim 11, wherein the cutting face of each tooth of the spline is curved in the axial direction to form a positive axial rake angle.

18. A programmable computer having a memory and a microprocessor, comprising:
    an inputting means for inputting a cross section of a helical spline of a cutting tool and a helical angle of the spline;
    a generating means for generating a helical curve conforming to an outer edge of a cutting surface of the helical spline;
    a forming means for forming a helical surface from the helical curve;
    a creating means for creating the helical spline from the helical curve; and
    a determining means for determining the female shape of the helical spline.

19. The computer of claim 18, further comprising an evaluating means for evaluating whether the helical angle exceeds a maximum predetermined helical angle.

20. The computer of claim 18, wherein the helical surface created by the creating means further comprises a positive radial rake angle.

21. The computer of claim 18, wherein the helical surface created by the creating means further comprises a positive axial rake angle.

* * * * *